United States Patent
O

(10) Patent No.: US 7,034,273 B1
(45) Date of Patent: Apr. 25, 2006

(54) SENSOR METHOD FOR DUAL LINE INTEGRATING LINE SCAN SENSOR

(75) Inventor: Nixon O, Waterloo (CA)

(73) Assignee: Dalsa, Inc., Ontario (CA)

( * ) Notice: Subject to any disclaimer, the term of this patent is extended or adjusted under 35 U.S.C. 154(b) by 39 days.

(21) Appl. No.: 10/418,044

(22) Filed: Apr. 18, 2003

Related U.S. Application Data

(62) Division of application No. 09/782,035, filed on Feb. 14, 2001, now Pat. No. 6,770,860.

(60) Provisional application No. 60/182,201, filed on Feb. 14, 2000.

(51) Int. Cl.
 *H04N 5/335* (2006.01)

(52) U.S. Cl. .................... 250/208.1; 348/315

(58) Field of Classification Search ........... 250/208.1, 250/214 R, 214 DC; 348/320–323, 294–295, 348/303, 305, 315
See application file for complete search history.

(56) References Cited

U.S. PATENT DOCUMENTS

| | | | | |
|---|---|---|---|---|
| 5,949,099 A | * | 9/1999 | Yasuda et al. | 257/230 |
| 6,028,299 A | * | 2/2000 | Hirama et al. | 250/208.1 |
| 6,166,831 A | * | 12/2000 | Boyd et al. | 358/483 |
| 6,552,747 B1 | * | 4/2003 | Hasegawa | 348/314 |
| 6,744,539 B1 | * | 6/2004 | Azuma et al. | 358/483 |
| 6,770,860 B1 | * | 8/2004 | O | 250/208.1 |

* cited by examiner

*Primary Examiner*—David V. Bruce
*Assistant Examiner*—Hoon Song
(74) *Attorney, Agent, or Firm*—Millen, White, Zelano & Branigan, P.C.

(57) ABSTRACT

A method includes a first step followed by a second step. The first step includes transferring photo charges in a delay register into a first readout register, transferring photo charges in a first storage register into the delay register, and transferring photo charges in a second storage register into a second readout register. The second step includes collecting photo charges in the first storage register, collecting photo charges in the second storage register, shifting photo charges in the first readout register toward a first output, and shifting photo charges in the second readout register toward a second output.

10 Claims, 5 Drawing Sheets

SENSOR METHOD FOR DUAL LINE INTEGRATING LINE SCAN SENSOR

This application is a divisional application of Ser. No. 09/782,035 filed Feb. 14, 2001 now U.S. Pat. No. 6,770,860, which claims the priority benefit of the Feb. 14, 2000 filing date of provisional application 60/182,201.

BACKGROUND OF THE INVENTION

1. Field of the Invention

The present invention relates to line scan photo sensors. In particular, the invention relates to a sensor architecture and method that increases the photo response by time delay and integration without compromising the sensor's blue and UV response.

2. Description of Related Art

In a line scan sensor, an image conjugate is scanned across a linear array of sensor pixels and/or a linear array of sensor pixels are scanned across an image conjugate. To achieve a higher speed sensor under the same ambient light conditions, the sensor must have pixels with a higher response to the same ambient light. Known sensors increase the response to ambient light conditions using a TDI architecture (Time Delay and Integrate architecture). TDI sensors are typically formed in a rectangular format where the image conjugate to be sensed moves across the face of the sensor pixels at the exact same rate that the photo charge accumulating in the pixels is transferred along the direction of a vertical CCD register so that the end of the vertical CCD register includes the accumulated photo charge generated by a single image area but accumulated over an extended time.

The photo charge in a TDI CCD sensor is clocked along the CCD registers under the influence of electric fields caused by clock voltages applied to the CCD gate electrodes, typically formed of doped polycrystalline silicon (commonly referred to as poly). The doped polycrystalline silicon conducts electrical signals, and infrared light passes through the doped polycrystalline silicon with ease; however, blue light and/or ultraviolet light are absorbed in the polycrystalline silicon layers. Such typical TDI CCD sensors lack a good response to blue light and/or UV light.

To improve response to blue light and/or UV light, linear arrays of photodiodes, and/or pinned photodiodes (PPD) are commonly used. Photodiodes and PPD's have good response to blue light and/or UV light at least in part because they are not covered by poly layers. Therefore, known TDI architectures are not useable.

In known sensors, the approach to improved response has been to try to increase the charge conversion efficiency (CCE) in a single linear array of photodiodes and/or PPD's. The CCE is process dependent, and a very good (and expensive) process is required to achieve very high CCE. Increasing the CCE also reduces the full well capacity, resulting in higher photon shot noise at saturation. The architecture of the present invention provides a two times increase in the response to light and a 30% reduction in photon shot noise in the sensor.

SUMMARY OF THE INVENTION

It is an object to the present invention to provide a line scan sensor with increased response to light stimulation. It is a further object of the present invention to achieve the increased response without a loss of blue or UV response.

These and other objects are achieved with a method that includes applying a transfer clock pulse to a transfer gate electrode of a first clocking structure and a transfer gate electrode of a second clocking structure, applying a first delay clock pulse to a delay well electrode of the first clocking structure after the transfer clock pulse is applied, and applying a second delay clock pulse to a delay well electrode of the second clocking structure before the transfer clock pulse is applied.

These and other objects are also achieved with an alternative method that includes a first step followed by a second step. The first step includes transferring photo charges in a delay register into a first readout register, transferring photo charges in a first storage register into the delay register, and transferring photo charges in a second storage register into a second readout register. The second step includes collecting photo charges in the first storage register, collecting photo charges in the second storage register, shifting photo charges in the first readout register toward a first output, and shifting photo charges in the second readout register toward a second output.

These and other objects are achieved with another method that includes collecting a first line of photo charges from a first line array of pixels, delaying the first line of charges, collecting a second line of charges from a second line array of pixels, shifting the delayed first line of charges toward a first output while simultaneously shifting the second line of charges toward a second output, and combining the first and second outputs.

These and other objects are achieved in an alternative embodiment of a line scan sensor that includes first and second rows of pixels, corresponding first and second readout registers, and a first clocking structure disposed between the first row of pixels and the first readout register. The first clocking structure includes a transfer gate electrode and a delay well electrode.

These and other objects are achieved in another alternative embodiment of a line scan sensor that includes first and second rows of pixels, a delay register coupled to the first row of pixels, a first readout register coupled to the delay register, and a second readout register coupled to the second row of pixels.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
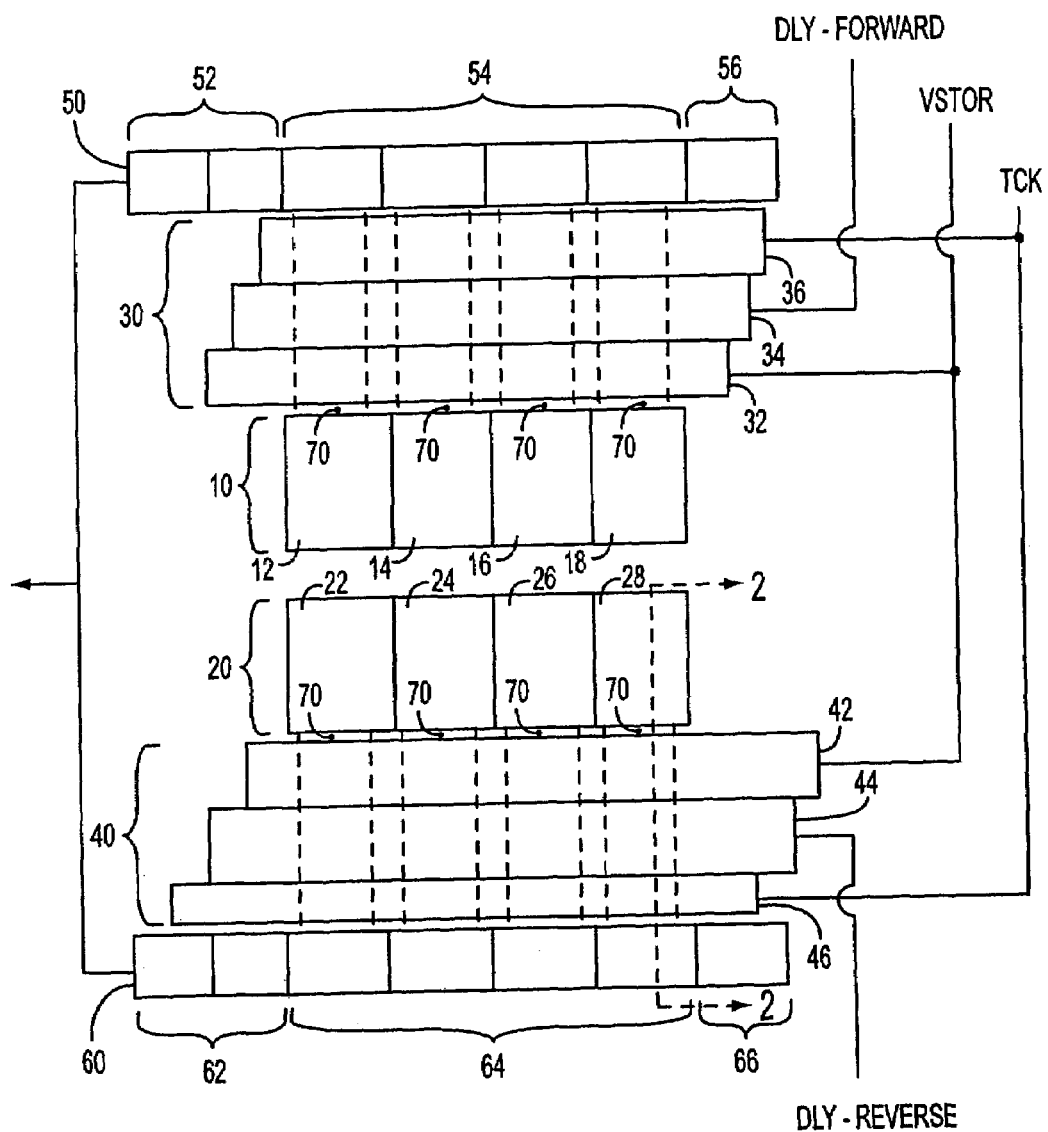
FIG. 1 is a plan view of a dual line integrating line scan sensor according to the present invention.

FIG. 1 is a plan view of a representative dual-line integrating line scan sensor according to the present invention. Although two four pixel rows are illustrated, any number of pixels may be included in a pixel row.

In FIG. 1, the sensor includes first and second rows of pixels 10 and 20. Each pixel in each row 12, 14, 16, 18, 22, 24, 26 and 28 is formed from either a photo diode or a pinned photo diode (PPD) to achieve good blue and/or UV light response. Co-parallel and spaced apart from first row of pixels 10 is first readout register 50. Co-parallel and spaced apart from second row of pixels 20 is second readout register 60. A plurality of first channel structure 70 extend from first row of pixels 10 to first readout register 50. Each channel structure of the first channel structures is disposed between a corresponding pixel of the first row of pixels and a corresponding register element of the first readout register. A plurality of second channel structures extend from second row of pixels 20 to second readout register 60. Each channel structure of the second channel structures is disposed between a corresponding pixel of the second row of pixels and a corresponding register element of the second readout register. The sensor is covered with a light shield (not shown for simplicity) except over the pixels where the photo diodes or PPDs are.

The sensor also includes first clocking structure 30 disposed over and transverse to the plurality of first channel structures. The first clocking structure includes storage well electrode 32, transfer gate electrode 36 and delay well electrode 34 disposed therebetween. The sensor further includes second clocking structure 40 disposed over and transverse to the plurality of second channel structures. The second clocking structure includes storage well electrode 42, transfer gate electrode 46 and delay well electrode 44 disposed therebetween.

First readout register 50 includes central portion 54 and isolation and/or dark cell elements 52 and 56. Similarly, second readout register 60 includes central portion 64 and isolation and/or dark cell elements 62 and 64.

The storage well electrodes of the first and second clocking structures are electrically connected and provided with voltage VSTOR to establish the charge capacity of the storage well for each pixel. Similarly, the transfer gate electrodes of the first and second clocking structures are electrically connected and provided with a transfer gate clock TCK to transfer charges in the delay wells of the first delay well register into the first readout register and simultaneously to transfer charges in the delay wells of the second delay well register into the second readout register. The first delay well electrode 34 and the second delay well electrode 44 are independently tied to separate voltages DLY-FORWARD and DLY-REVERSE. The timing of clock pulses applied to separate voltages DLY-FORWARD and DLY-REVERSE defines whether the delay wells pass the charges directly from the storage register to the readout register or cause an intermediate delay in the delay register.

Figure 2:
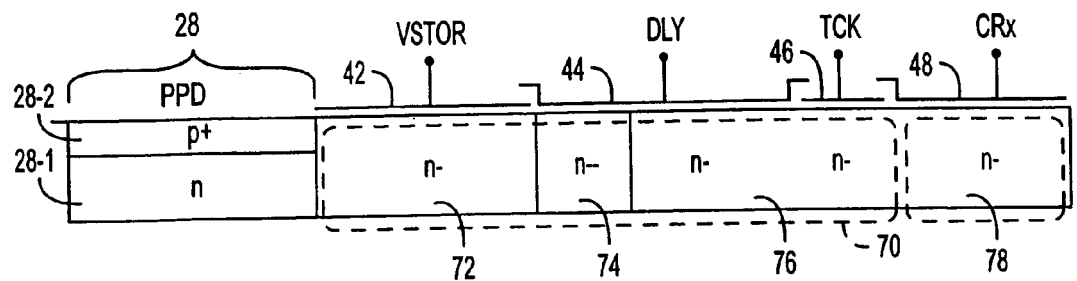
FIG. 2 is a section view through a delay register of a dual line integrating line scan sensor according to the present invention.

A section through a channel from a single pixel to a corresponding readout element is depicted in FIG. 2. FIG. 2 is a section view through a delay register of a dual-line integrating line scan sensor according to the present invention.

In FIG. 2, a pinned photo diode is formed in region 28. Region 28 includes deep channel 28-1 of N conductivity type overlayed by shallow implant 28-2 of P+ conductivity type. Throughout, it is assumed that the sensor is formed in a substrate of P− conductivity type. A storage well is formed under storage well electrode 42. Storage well electrode 42 is disposed over a channel 72 of N− conductivity type. The delay register includes a delay well that is formed under delay well electrode 44. Delay well electrode 44 overlays first delay well region 74 of an N−− conductivity type and a portion of channel region 76 of an N− conductivity type. The transfer gate is formed under transfer gate electrode 46. Transfer gate electrode 46 also overlays a portion of channel region 76 of the N− conductivity type. Readout registers 50 and 60 include a plurality of register elements. A single clock phase of an element is represented by region 78 of an N− conductivity type formed under readout clock electrode 48. Storage well electrode 42, delay well electrode 44, transfer gate electrode 46 and readout clock electrode 48 are all formed of doped polycrystalline silicon.

Figure 3A:
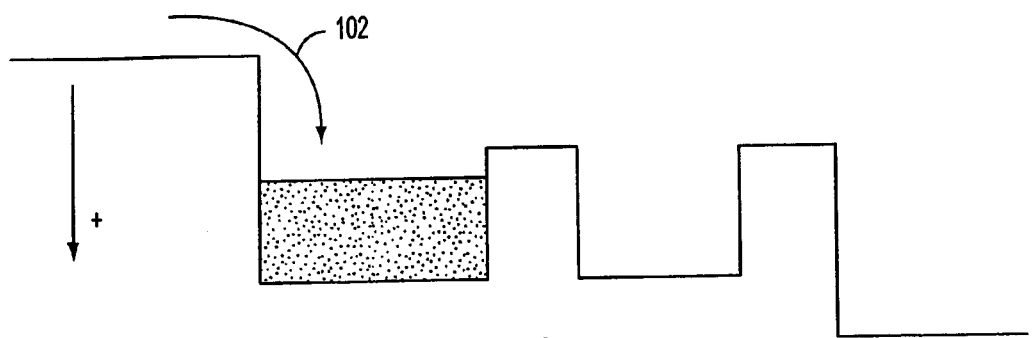
FIG. 3A is a potential well diagram of the section view of FIG. 2 showing the transfer of photo charge into a storage well according to the present invention.
Figure 3B:
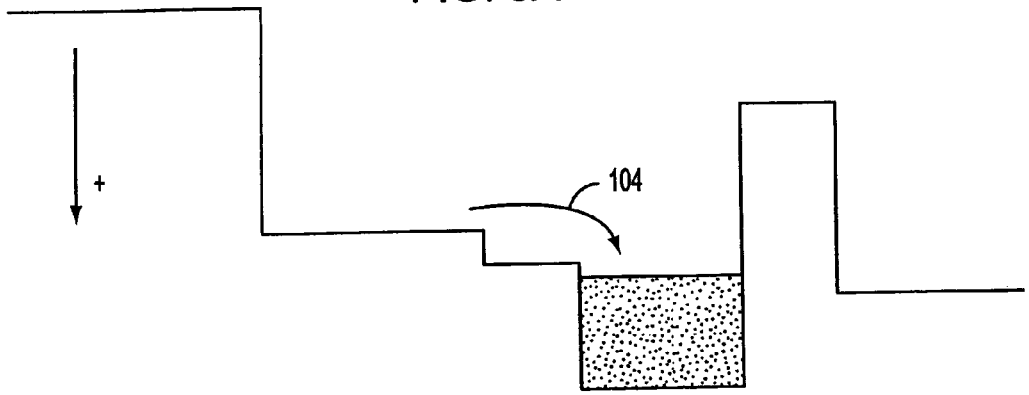
FIG. 3B is a potential well diagram of the section view of FIG. 2 showing the transfer of photo charge into a delay well according to the present invention.
Figure 3C:
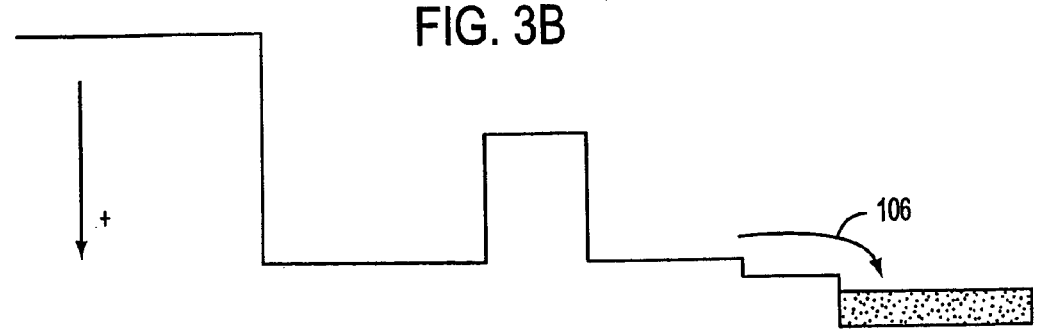
FIG. 3C is a potential well diagram of the section view of FIG. 2 showing the transfer of photo charge into a well of a readout register according to the present invention.

FIGS. 3A, 3B and 3C are potential well diagrams corresponding to the section view of FIG. 2 showing the transfer of photo charge into a storage well, the transfer of photo charge into a delay well, and the transfer of photo charge into a well of a readout register, respectively. These figures assume that an N conductivity type channel has been formed in a P− substrate. More positive potentials are shown toward the bottom of the potential diagram.

In FIG. 3A, signal electrons spill over into the storage well at 102. The photo electrons are generated in the photo diode at a low potential and are attracted to the more positive potential in the storage well under the storage well electrode 42. During the integration phase, the delay voltage (DLY) placed on delay well electrode 44 (and 34) is held to a minimum potential so as to form a barrier to contain the photo charge that spills into and accumulates in the storage well.

In FIG. 3B, the voltage applied to delay well electrode 44 is pulsed positive to eliminate the barrier that contained the photo charge in the storage well. The photo charge in the storage well then spills over into the delay well at 104. The transfer gate electrode 46 is maintained at a minimum potential to create a barrier to contain the photo charge in the delay well.

In FIG. 3C, the voltage applied to delay well electrode 44 returns to a minimal voltage and the voltage on both the transfer gate electrode 46 and the readout clock electrode 48 is pulsed positive so that signal electrons (photo charge) spill over into the horizontal CCD readout register at 106.

The operation of the sensor depends on the timing relationship between the transfer clock (TCK) and the delay-forward clock (DLY-FORWARD) and the delay-reverse clock (DLY-REVERSE). When no delay is required, the signal DLY is pulsed shortly before the signal TCK. When a single line delay is required, signal DLY is pulsed shortly after signal TCK. By turning pulsing the delay well electrode clock before or after the transfer gate is enabled, a selectable delay is achieved. When the scan is from the top of FIG. 1 to the bottom, the top array is delayed (i.e., pulse signal DLY-FORWARD after signal TCK is pulsed). When the scan is from the bottom of FIG. 1 to the top, the bottom array is delayed (i.e., pulse signal DLY-REVERSE after signal TCK is pulsed). The sensor can therefore be used for bi-directional scanning.

Figure 4:
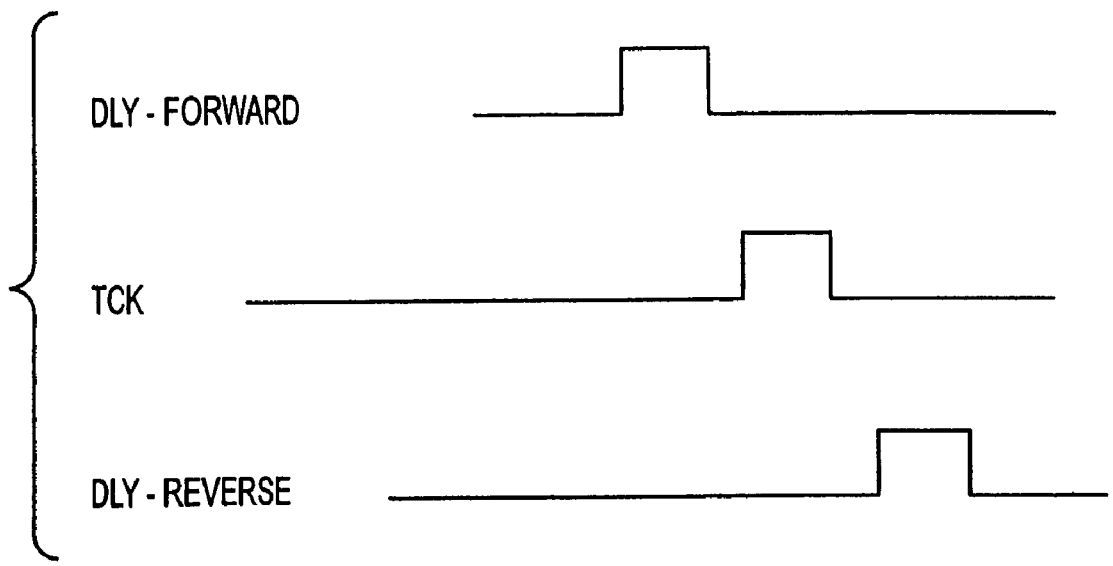
FIG. 4 is a timing diagram of the DLY-FORWARD, TCK and DLY-REVERSE pulses on the delay and transfer clock electrodes to affect a times two integration of the sensor's responsivity when the image conjugate is scanned across the sensor from the bottom of the sensor depicted in FIG. 1 to the top of the sensor depicted in FIG. 1.
Figure 5:
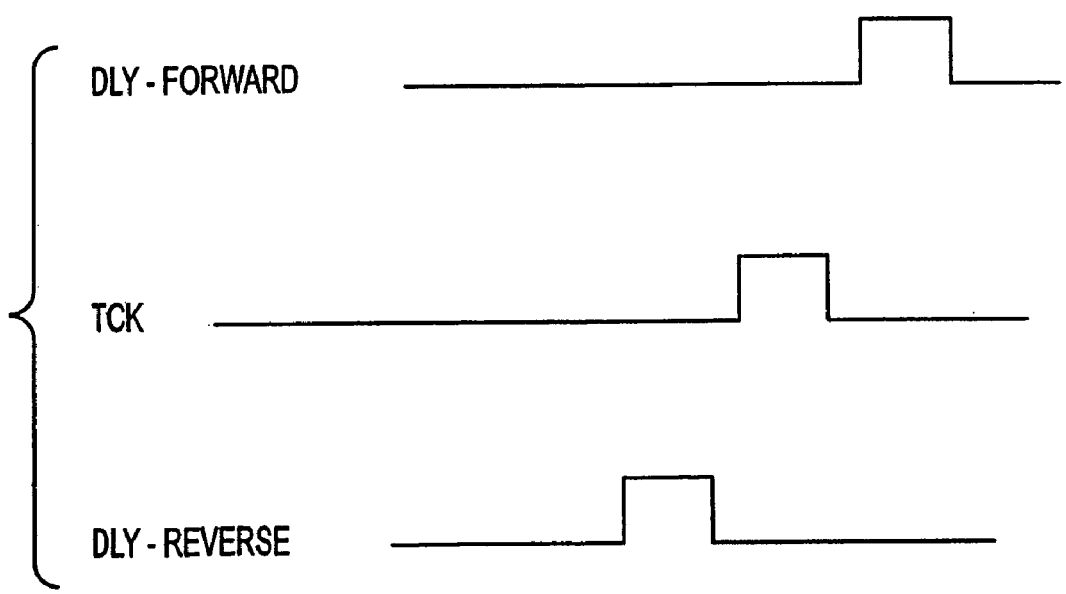
FIG. 5 is a timing diagram of the DLY-FORWARD, TCK and DLY-REVERSE pulses on the delay and transfer clock electrodes to affect a times two integration of the sensor's responsivity when the image conjugate is scanned across the sensor from the top of the sensor depicted in FIG. 1 to the bottom of the sensor depicted in FIG. 1.

FIG. 4 is a timing diagram of the DLY-FORWARD, TCK and DLY-REVERSE pulses on the delay well and transfer gate electrodes to affect a times two integration of the sensors response to light when the image conjugate is scanned across the sensor from the bottom of the sensor depicted in FIG. 1 to the top of the sensor depicted in FIG. 1. FIG. 5 is a timing diagram of the DLY-FORWARD, TCK and DLY-REVERSE pulses on the delay well and transfer gate electrodes to affect the times two integration of the sensors response to light when the image conjugate is scanned across the sensor from the top of the sensor depicted in FIG. 1 to the bottom of the sensor depicted in FIG. 1. The times two integration results from the operation of two rows of photo diodes and/or pinned photo diodes being integrated together. The use of photo diodes or PPDs maintains the blue and/or UV light response of the pixel without the loss due to an overlayer of poly that would result in a known TDI CCD sensor.

In general, the architecture described herein includes two parallel arrays of pixels. When the sensor is used to scan in the forward (top to bottom) direction the top array receives light photons one line extent before the bottom array. With the selectable delay, signal electrons from the top line array can be delayed by one line so that when the signals are eventually read out of the horizontal CCD readout register, the signal from the top row of pixels and from the bottom row of pixels will be identically timed.

Signal electrons from the top and bottom arrays can be either (1) internally combined into a single output node, or (2) readout using separate outputs. The internally combined photo charges are then converted to an output signal in a buffer/amplifier before being provided to "off chip" circuitry. However, when separately providing the photo charges from each readout register, the output of each readout register is separately converted into a signal by a buffer/amplifier before it is provided to "off chip" circuitry. Then the "off chip" circuitry combines the separate signals into an output signal. The former approach is a preferred embodiment since the delay is transparent to the end user and since this approach has about 30% less reset noise and amplifier noise than the second approach.

The storage well electrode on either a photo diode line scan sensor or a pinned photo diode line scan sensor is optional. The storage well can be removed if a lateral anti-blooming and exposure control structure is not required. In applications where the storage well is not present, charges are stored directly in the photo diode or beneath the pinned photo diode.

When present, exposure control and anti-blooming are accomplished through a lateral anti-blooming structure off of the storage well. This structure provides several advantages over the conventional TDI architecture. Among these advantages are that only one additional clock is required. The additional clock is similar to the transfer clock (TCK) and can easily be metal-strapped for a faster transfer. Also, blue and/or UV response is not compromised by the overlying poly layers (as in photo gate pixels). There is no poly silicon gate over the photosensitive area. The fill factor in the UV remains 100%. In addition, exposure control is available.

Figure 6:
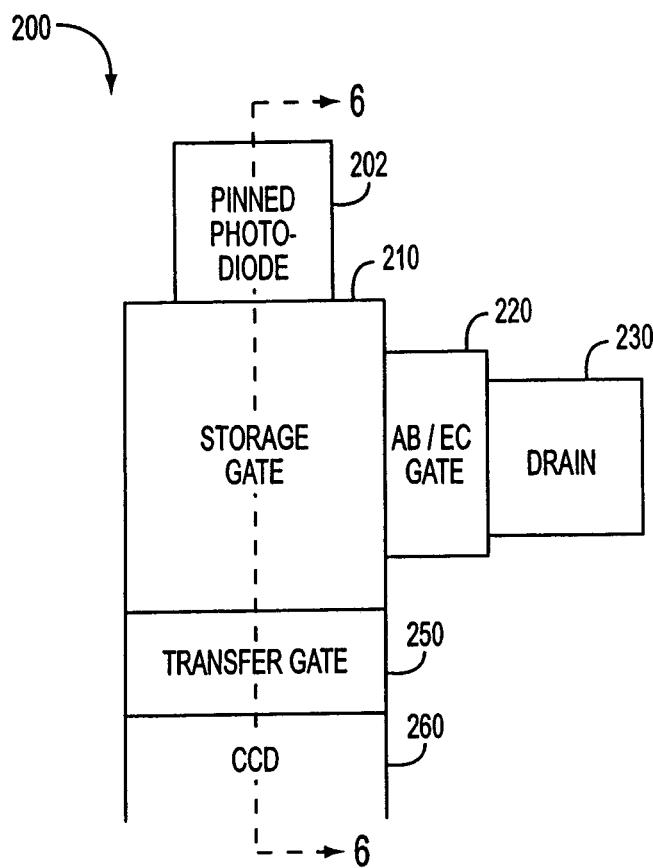
FIGS. 6 and 8 are plan views of a structure depicting the anti-blooming and exposure control aspects of the present invention.

In FIG. 6, a plan view of simplified structure 200 (shown without the delay gate for simplicity) illustrates how a lateral anti-blooming structure is attached to a storage gate. Pinned photo diode 202 (or a photo diode) is coupled to storage gate 210. Storage gate 210 is coupled through delay gate 240 (not shown for simplicity) to transfer gate 250. In turn, transfer gate 250 is coupled to CCD 260 (e.g., one of the readout registers). Also, storage gate 210 is coupled through anti-blooming and exposure control gate 220 to drain 230.

Figure 7:
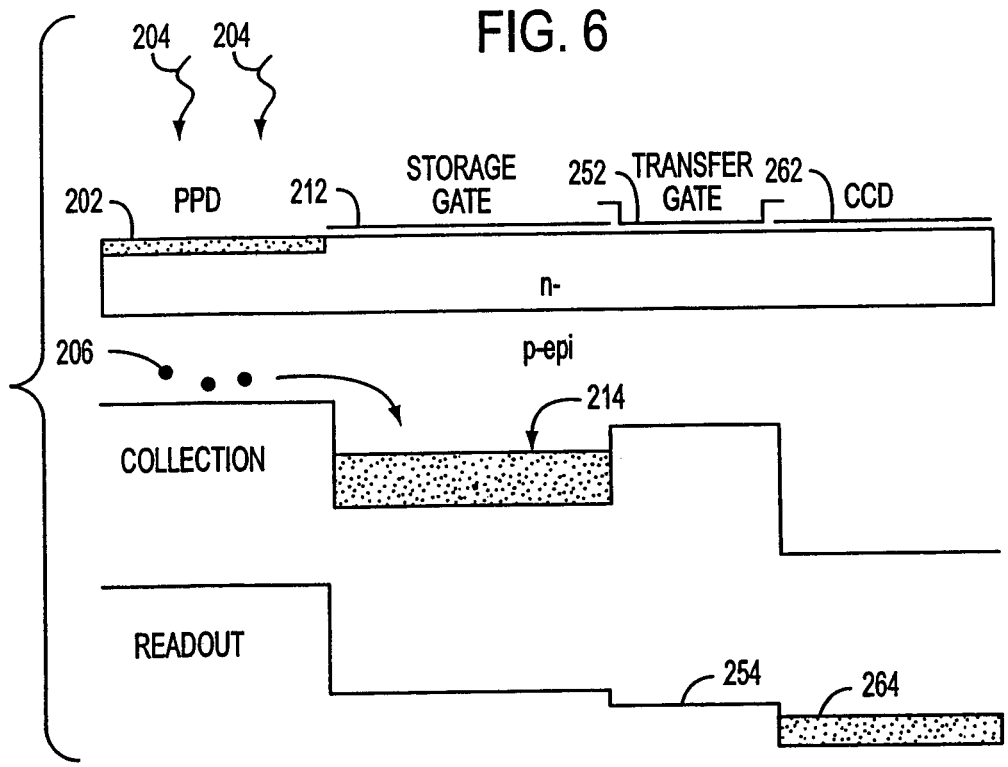
FIGS. 7 and 9 are lateral section views and potential well diagrams of the structure depicting the anti-blooming and exposure control aspects of the present invention

In FIG. 7, during the collection phase, photons 204 cause pinned photo diode 202 to collect photo charge 206 so as to transfer the charge directly to well 214 that is induced under storage gate electrode 212 of storage gate 210 by a potential applied to electrode 212. At the end of the collection phase, during a readout phase, a voltage pulse is applied to transfer gate electrode 252 to reduce barrier 254 so as to enable charge transfer from well 214 into well 264 induced by a potential readout gate electrode 262 of CCD readout register element 260. A delay element is not shown for simplicity.

Figure 8:
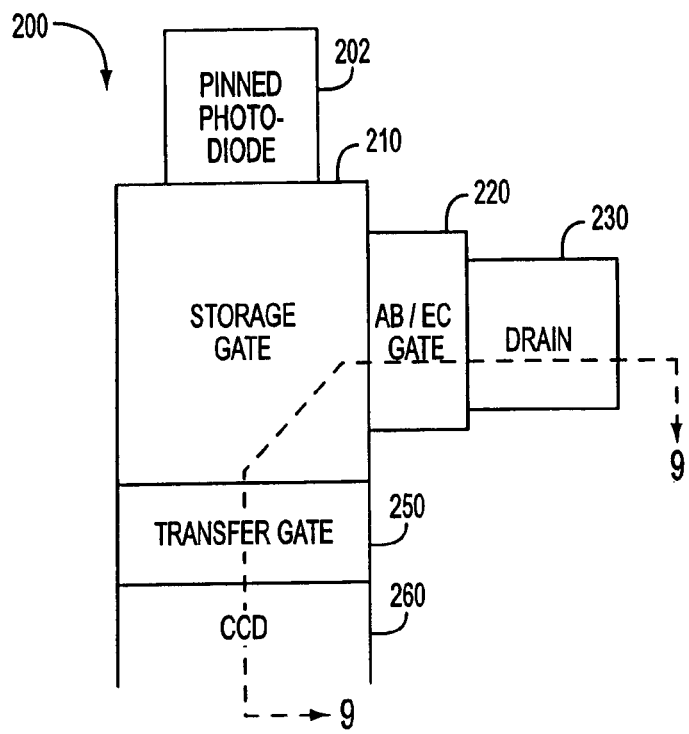

In FIG. 8, a plan view of simplified structure 200 (shown without the delay gate for simplicity) illustrates how a lateral anti-blooming structure attached to storage gate 210 operates in a charge collection phase, an anti-blooming phase and an exposure control phase. Pinned photo diode 202 (or a photo diode) is coupled to storage gate 210. Storage gate 210 is coupled through delay gate 240 (not shown for simplicity) to transfer gate 250. In turn, transfer gate 250 is coupled to CCD 260 (e.g., one of the readout registers). Also, storage gate 210 is coupled through anti-blooming and exposure control gate 220 to drain 230.

Figure 9:
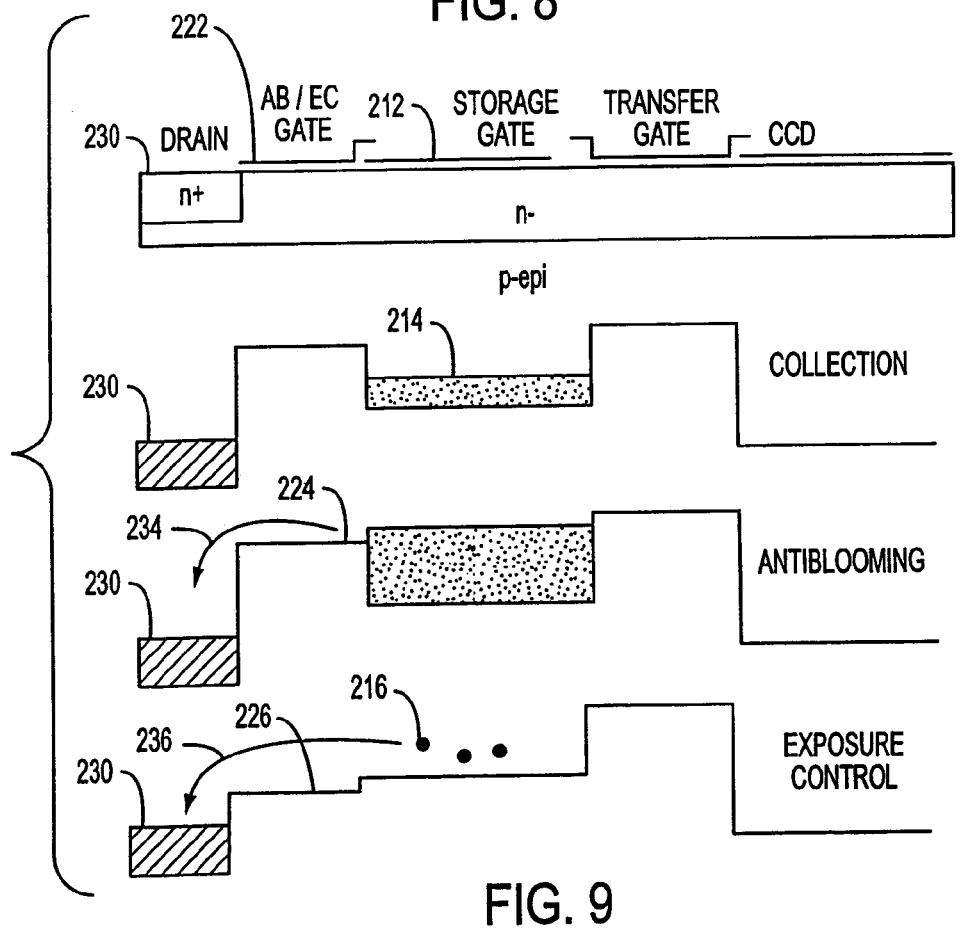

In FIG. 9, during the collection phase, photons cause a pinned photo diode to collect photo charge and transfer the charge directly to storage well 214 that is induced under storage gate electrode 212 of storage gate 210 by a potential applied to electrode 212. During this collection phase, it may happen that one or more pixels will collected so much charge that it would try to spill over to other pixels (i.e., bloom). To avoid this effect, a positive potential is applied to drain 230 to attract and drain away electrons. A first predetermined threshold potential is applied to AB/EC gate electrode 222 to set first predetermined threshold barrier 224 so that if excessive electrons were to collect in well 214, the excess electrons would spill over barrier 224 at 232 and be drained away by drain 230. This permits signal charge to collect in well 214 up to first predetermined threshold barrier 224.

However, if all of the pixels collect sufficient charge to exceed the barrier, no image can be collected. Therefore, an exposure control phase will be activated to reduce the time during which photo charge is allowed to collect in storage well 214. As in the anti-blooming phase, a positive potential is applied to drain 230 to attract and drain away electrons. In the exposure control phase, a second predetermined threshold potential is applied to AB/EC gate electrode 222 to set second predetermined threshold barrier 226 so that all generated photo electrons 216 spill over barrier 226 at 236 and are drained away by drain 230. Therefore, no photo charge is permitted to collect in well 214. This exposure control phase is activated for only a part of the collection cycle. For example, if the exposure control phase is limited to 50% of the collection time that would otherwise operate, only half of the photo charge is collected. By controlling the duration of the exposure control phase as a percentage of the collection cycle, it is possible to avoid the situation where all of the pixels saturate in the anti-blooming phase.

As a variant to the above described embodiment depicted in FIG. 1, a light shielded bi-directional buffer might be added between the two rows of pixels 10, 20 to reduce crosstalk. The sensor would be modified to have a two stage delay register in place of each delay register 34, 44. The clock rate must be adjusted so that the repeat interval equals the time it takes for the image conjugate to move from one row of pixels to another.

Careful attention to potential levels is important in this embodiment to ensure that photo charge will cascade efficiently from the storage well to the readout register when no delay is selected. Also, careful attention to potential levels is important in this embodiment to ensure that adequate charge holding capacity exists in each step of the delay wells when a pulse delay is required.

Having described preferred embodiments of a sensor method for a novel dual line integrating line scan sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method comprising:
   applying a transfer clock pulse to a transfer gate electrode of a first clocking structure and a transfer gate electrode of a second clocking structure;
   applying a first delay clock pulse to a delay well electrode of the first clocking structure after the transfer clock pulse is applied; and
   applying a second delay clock pulse to a delay well electrode of the second clocking structure before the transfer clock pulse is applied.

2. A method comprising a first step followed by a second step, wherein:
   the first step includes transferring photo charges in a delay register into a first readout register;
   the first step further includes transferring photo charges in a first storage register into the delay register;
   the first step further includes transferring photo charges in a second storage register into a second readout register;
   the second step includes collecting photo charges in the first storage register;
   the second step further includes collecting photo charges in the second storage register;
   the second step further includes shifting photo charges in the first readout register toward a first output; and
   the second step further includes shifting photo charges in the second readout register toward a second output.

3. The method of claim 2, further including repeating the first step and then the second step.

4. The method of claim 2, further comprising:
   combining photo charges at the first and second outputs; and
   converting the combined photo charges into a signal.

5. The method of claim 2, further comprising:
   converting photo charges at the first output into a first signal;
   converting photo charges at the second output into a second signal; and
   combining the first and second signals into an output signal.

6. A method comprising:
   collecting a first line of photo charges from a first line array of pixels;
   delaying the first line of photo charges;
   collecting a second line of photo charges from a second line array of pixels;
   shifting the delayed first line of photo charges toward a first output while simultaneously shifting the second line of photo charges toward a second output; and
   combining the delayed first line of photo charges at the first output with the second line of photo charges at the second output.

7. A method according to claim 6, wherein the combining a includes combining the photo charges at the first and second outputs to form a single combined charge packet.

8. A method according to claim 6, further includes repeating the combining each time the second line of photo charges is shifted toward the second output.

9. The method of claim 6, wherein the first and second line arrays of pixels are co-parallel but not spatially offset in the longitudinal direction.

10. The method of claim 6, wherein:
    the first and second line arrays of pixels are co-parallel;
    each pixel in the first line array of pixels has a corresponding pixel in the second line array of pixels defining a pixel pair; and
    pairs of corresponding pixels have mirror symmetry across a line co-parallel to a longitudinal direction of the first line array of pixels.

* * * * *

UNITED STATES PATENT AND TRADEMARK OFFICE
CERTIFICATE OF CORRECTION

PATENT NO. : 7,034,273 B1 Page 1 of 1
APPLICATION NO. : 10/418044
DATED : April 25, 2006
INVENTOR(S) : Nixon O It is certified that error appears in the above-identified patent and that said Letters Patent is hereby corrected as shown below:

Column 8, line 32, reads "a includes" should read -- includes --

Signed and Sealed this

Twentieth Day of March, 2007

JON W. DUDAS
*Director of the United States Patent and Trademark Office*